United States Patent
Park

(10) Patent No.: US 9,423,649 B2
(45) Date of Patent: Aug. 23, 2016

(54) BACKLIGHT UNIT AND LIQUID CRYSTAL DISPLAY DEVICE INCLUDING THE SAME

(71) Applicant: LG Display Co., Ltd., Seoul (KR)

(72) Inventor: Ki-Duck Park, Paju-si (KR)

(73) Assignee: LG Display Co., Ltd., Seoul (KR)

(*) Notice: Subject to any disclaimer, the term of this patent is extended or adjusted under 35 U.S.C. 154(b) by 66 days.

(21) Appl. No.: 14/248,132

(22) Filed: Apr. 8, 2014

(65) Prior Publication Data

US 2014/0307198 A1  Oct. 16, 2014

(30) Foreign Application Priority Data

Apr. 10, 2013  (KR) .................. 10-2013-0039035

(51) Int. Cl.
*G02F 1/1335* (2006.01)
*F21V 8/00* (2006.01)

(52) U.S. Cl.
CPC ............ *G02F 1/1336* (2013.01); *G02B 6/0001* (2013.01); *G02B 6/001* (2013.01); *G02B 6/0036* (2013.01); *G02B 6/0078* (2013.01); *G02B 6/0088* (2013.01)

(58) Field of Classification Search
CPC .... G02F 1/1336; G02B 6/0001; G02B 6/001; G02B 6/0036; G02B 6/0078; G02B 6/0088
USPC ........................................................ 362/628
See application file for complete search history.

(56) References Cited

U.S. PATENT DOCUMENTS

2005/0270796 A1* 12/2005 Ichikawa ............... G02B 6/001
362/559
2012/0287670 A1* 11/2012 Ishizaka ............... G02B 6/0088
362/606

FOREIGN PATENT DOCUMENTS

| CN | 201731379 U | 2/2011 |
|---|---|---|
| CN | 102338904 A | 2/2012 |
| JP | 2003-344672 A | 12/2003 |
| JP | 2004-226710 A | 8/2004 |
| JP | 2004-311100 A | 11/2004 |
| JP | 2005-347214 A | 12/2005 |
| JP | 2007-27137 A | 2/2007 |
| JP | 2012-174446 A | 9/2012 |
| KR | 2002-0042589 A | 6/2002 |
| WO | WO 2008/114507 A1 | 9/2008 |
| WO | WO 2009/157352 A1 | 12/2009 |

OTHER PUBLICATIONS

Japanese Patent Office, Office Action, Japanese Patent Application No. 2014-077444, Feb. 24, 2015, five pages [with concise explanation of relevance in English].
State Intellectual Property Office of the People's Republic of China, First Office Action, Chinese Patent Application No. 201410132964. 1, Dec. 2, 2015, seventeen pages.

* cited by examiner

*Primary Examiner* — Charles Chang
(74) *Attorney, Agent, or Firm* — Fenwick & West LLP

(57) ABSTRACT

A backlight unit includes first and second light sources; first and second light guide bars positioned between the first and second light sources and each having a branch shape; and a mold frame accommodating the first and second light sources and the first and second light guide bars.

20 Claims, 10 Drawing Sheets

BACKLIGHT UNIT AND LIQUID CRYSTAL DISPLAY DEVICE INCLUDING THE SAME

BACKGROUND OF THE INVENTION

The present application claims the benefit of Korean Patent Application No. 10-2013-0039035, filed in Korea on Apr. 10, 2013, which is hereby incorporated by reference.

BACKGROUND OF THE INVENTION

1. Field of the Invention

The present invention relates to a liquid crystal display device, and more particularly, to a backlight unit using a branch-shaped light guide bar and a liquid crystal display device including the backlight unit.

2. Discussion of the Related Art

A liquid crystal display (LCD) device displays images using an interior light source. Since the liquid crystal panel does not include a light source, an additional light source is required. For example, a backlight unit including a light source is disposed under a liquid crystal panel to illuminate the liquid crystal panel.

FIG. 1 is an exploded perspective view of an edge type backlight unit 1.

As shown in FIG. 1, the backlight unit 1 includes a light source 10. For example, the light source 10 includes one of a cold cathode fluorescent lamp and a light emitting diode (LED). FIG. 1 shows the LED as the light source 10. In this instance, the backlight unit 1 may include a light frame 11 covering the light source 10.

The backlight unit 1 further includes a light guide plate 6, a diffusion plate 7, first and second light concentration plates 8 and 9, a mold frame 2, and a reflection plate 4. The light source 10 is disposed to the side of the light guide plate 6, and the light from the light source 10 is processed into planar light by the light guide plate 6. The diffusion plate 7 is disposed on or over the light guide plate 6, and the light from the light guide plate 6 is uniformly provided into a display region of a liquid crystal panel (not shown) by the diffusion plate 7. The first and second light concentration plates 8 and 9 are disposed on or over the diffusion plate 7, and the brightness of the light is improved by the first and second light concentration plates 8 and 9. The reflection plate 4 is disposed under the light guide plate 6 such that the light from the light guide plate 6 is reflected by the reflection plate 4. The mold frame 2 is disposed under the reflection plate 4 and accommodates the above elements. The light source 10 is fixed by the mold frame 2 and the light frame 11.

A backlight unit 1 having the above structure may be referred to as an edge type backlight unit 1. The edge type backlight unit 1 has an advantage in reduced thickness. However, since the edge type backlight unit requires the light guide plate 6, the weight of the backlight unit is increased. In addition, movement or thermal expansion of the light guide plate 6 may decrease the light uniformity of the edge type backlight unit 1. To resolve the above problems, a direct type backlight unit is introduced.

FIG. 2 is an exploded perspective view of a direct type backlight unit 20.

As shown in FIG. 2, the direct type backlight unit 20 includes a light source 10 under a liquid crystal panel (not shown) without a light guide plate 6 (of FIG. 1). For example, the light source 10 includes one of a cold cathode fluorescent lamp and a LED. FIG. 1 shows the LED as the light source 10.

The light source 10 is disposed on a bottom surface of a mold frame 2, and a diffusion plate 7 and first and second light concentration plates 8 and 9 are disposed over the light source 10. The backlight unit 20 further includes a reflection plate 4 on the mold frame 2. The reflection plate 4 includes a through hole for the light source 10.

Since the direct type backlight unit 20 in FIG. 2 does not include the light guide plate 6 (of FIG. 1), the uniformity of the light provided by the direct type backlight unit 20 is improved. However, in the direct type backlight unit 20, the diffusion plate 7 should be spaced apart from the light source by a pre-determined distance, e.g., an optical gap, for light mixing, which increases the thickness of the direct type backlight unit 20.

SUMMARY OF THE INVENTION

Accordingly, the present invention is directed to a backlight unit and a LED device including the same that substantially obviate one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the structures particularly pointed out in the written description and claims as well as the appended drawings.

To achieve these and other advantages and in accordance with the purpose of the present invention, as embodied and broadly described herein, the present invention provides a backlight unit that includes first and second light sources; first and second light guide bars positioned between the first and second light sources and each having a branch shape; and a mold frame accommodating the first and second light sources and the first and second light guide bars.

In another aspect of the present invention, the present invention provides a liquid crystal display device including a liquid crystal panel; and a backlight unit disposed under the liquid crystal panel, the backlight unit including: first and second light sources; first and second light guide bars positioned between the first and second light sources and each having a branch shape; and a mold frame accommodating the first and second light sources and the first and second light guide bars.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 3A:
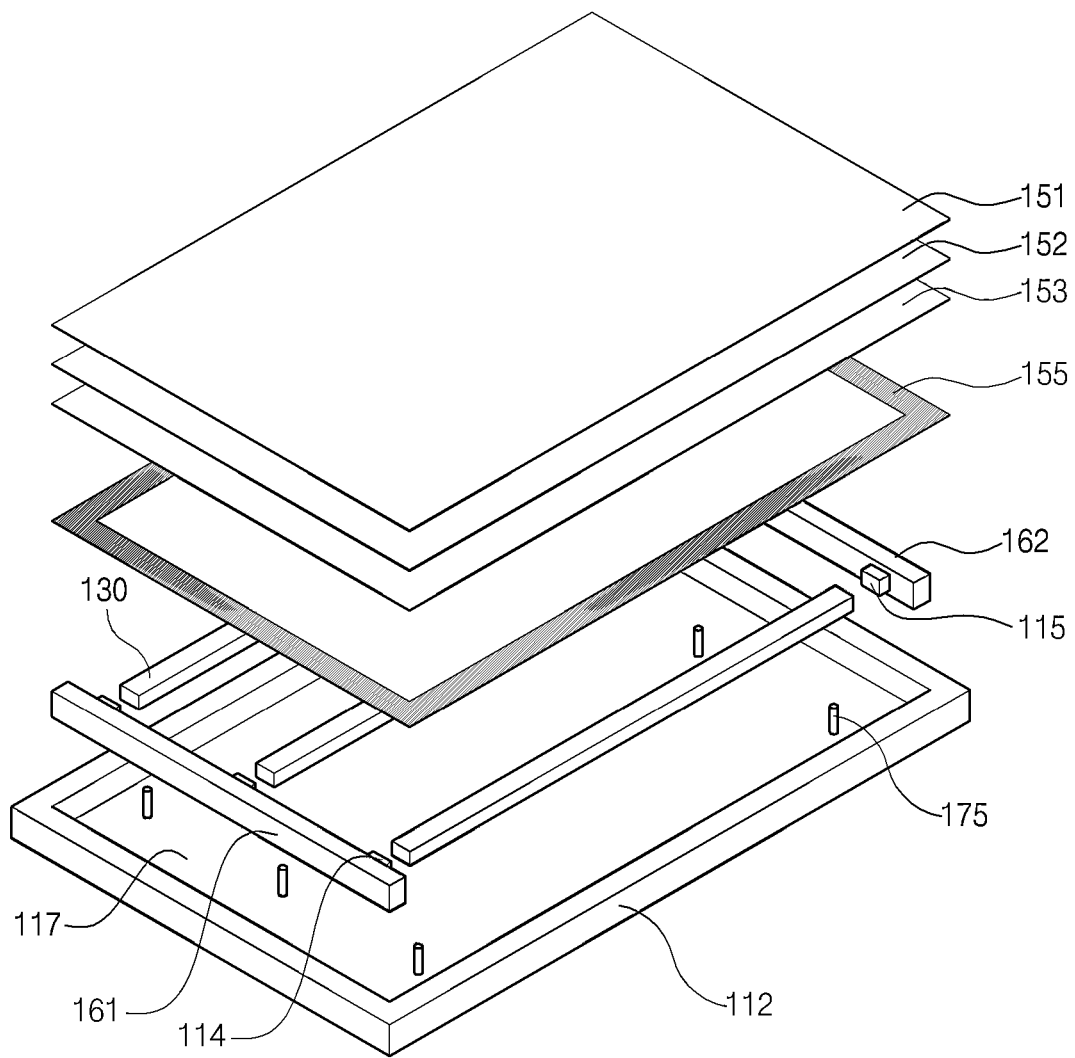
FIG. 3A is an exploded perspective view of a backlight unit according to a first embodiment of the present invention.
Figure 3B:
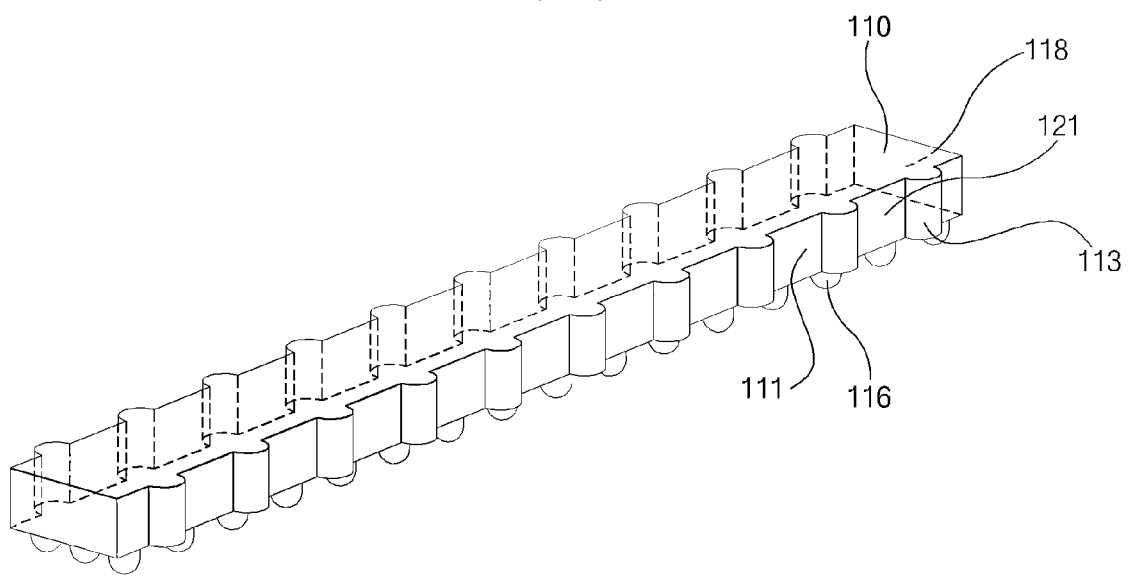
FIG. 3B is a perspective view of a light guide bar according to the first embodiment of the present invention.

FIG. 3A is an exploded perspective view of a backlight unit according to a first embodiment of the present invention, and FIG. 3B is a perspective view of a light guide bar according to the first embodiment of the present invention.

As shown in FIG. 3A, a backlight unit according to the first embodiment of the present invention includes first and second light sources opposite to each other, a plurality of light guide bars 130, and a mold frame 112. A LCD device includes the backlight unit, a liquid crystal panel over the backlight unit, and a main frame surrounding the backlight unit and the liquid crystal panel. The LCD device may further include a top frame covering a front edge of the liquid crystal panel. The main frame and the top frame are combined with the mold frame 112.

Although not shown, the liquid crystal panel includes first and second substrates facing each other as well as a liquid crystal layer therebetween. For example, a pixel electrode is formed on the first substrate, and a common electrode is formed on the first substrate or the second substrate. In addition, first and second polarizing plates are formed on an outer side of each of the first and second substrates.

The first light source includes a plurality of first LEDs 114 and a first circuit board 161, and the second light source includes a plurality of second LEDs 115 and a second circuit board 162. The first and second LEDs 114 and 115 are installed on the first and second circuit boards 161 and 162, respectively. The light guide bars 130 are positioned between the first and second light sources. One end of the light guide bar 130 corresponds to the first LED 114 of the first light source, and the other end of the light guide bar 130 corresponds to the second LED 115 of the second light source. The first and second light sources and the light guide bar 130 are accommodated in the mold frame 112.

The backlight unit may further include a reflection sheet 117 under the light guide bar 130, a diffusion sheet 155 over the light guide bar 130, and at least one optical sheet 151, 152 and 153 on or over the diffusion sheet 155. One or more pins 175 for fixing the light guide bar 130 may be formed on the reflection sheet 117. For example, the optical sheets may include a diffusion sheet 151 and first and second light concentration sheets 152 and 153.

The light guide bar 130 has a straight bar shape. Referring to FIG. 3B, the light guide bar 130 includes an upper surface 110 as a light-output surface, a lower surface 111 as a light reflection surface, a first side surface 118 as a light-incident surface, and a second side surface 121. The upper surface 110 and the first side surface 118 may be flat. A first protrusion 116 and a second protrusion 113 may be formed on the lower surface 111 and the second side surface 121, respectively.

Figure 1:
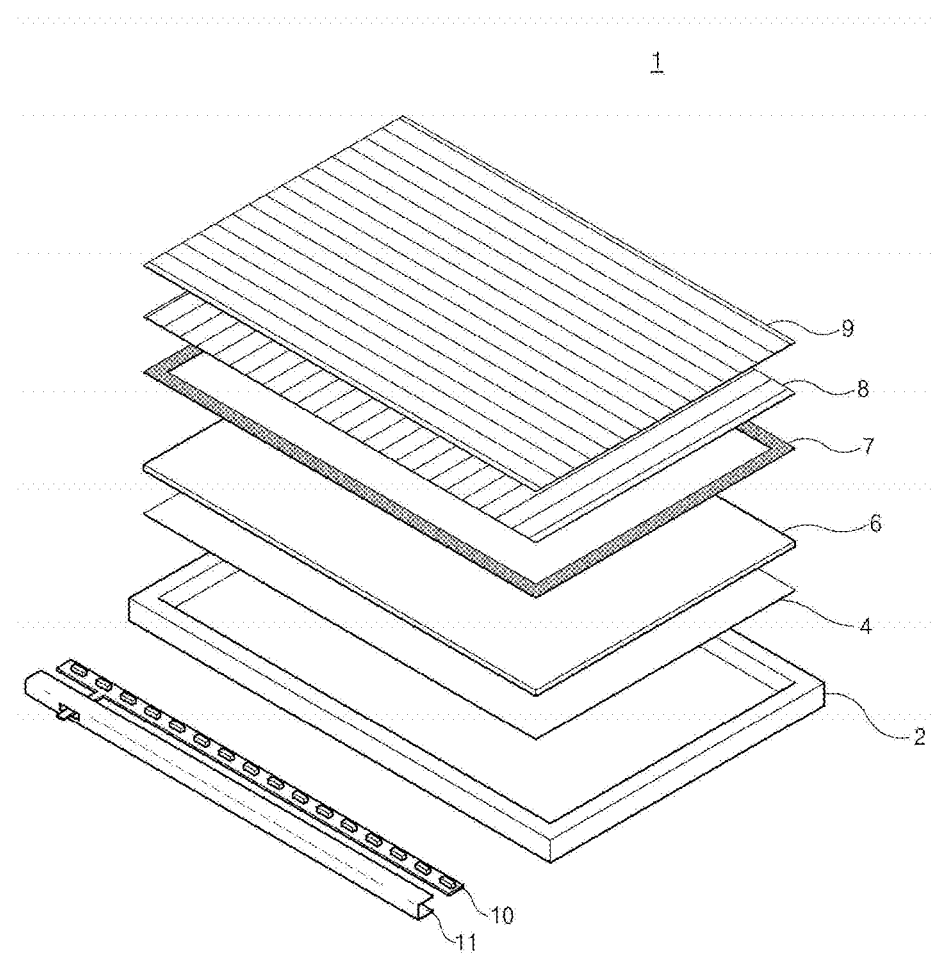
FIG. 1 is an exploded perspective view of an edge type backlight unit.
Figure 2:
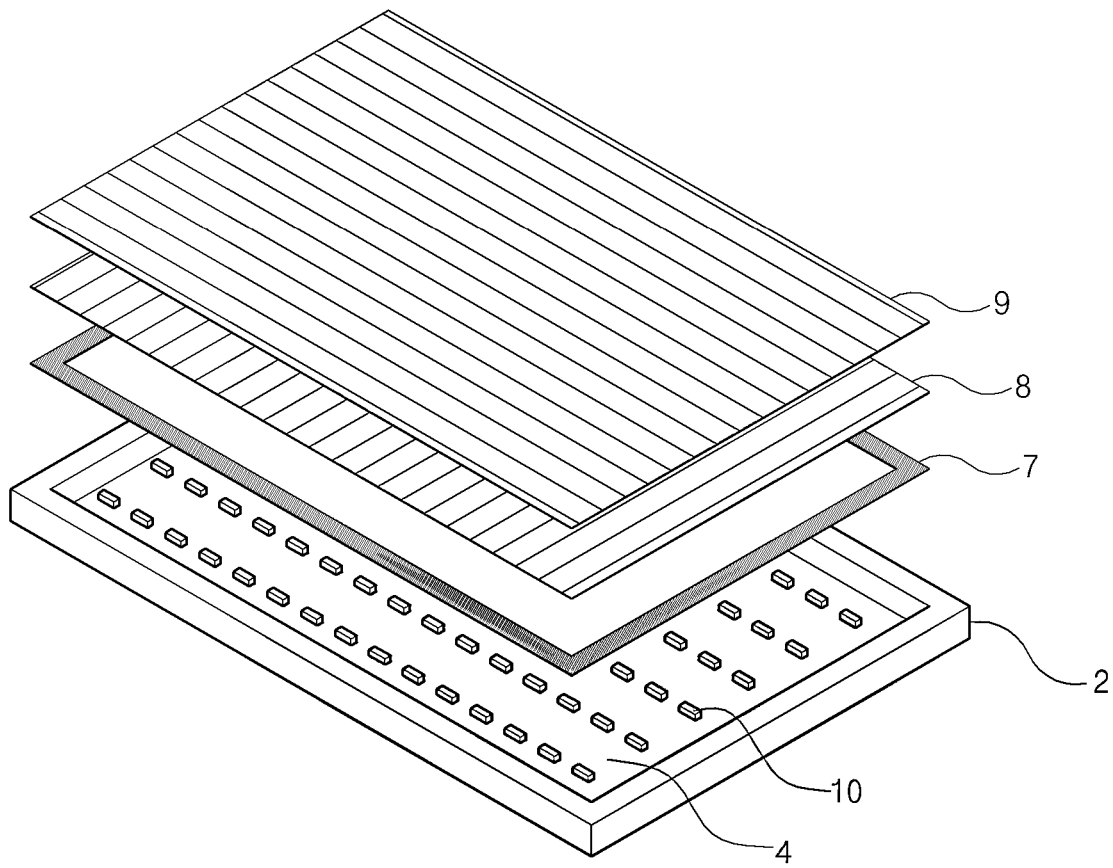
FIG. 2 is an exploded perspective view of a direct type backlight unit.

As shown in FIG. 3A, the plurality of light guide bars 130 are arranged to be spaced apart from each other by a distance. The backlight unit that includes the light guide bars 130 instead of the light guide plate 6 (of FIG. 1) has an advantageously reduced weight. However, there is a disadvantage in the light uniformity.

Figure 4:
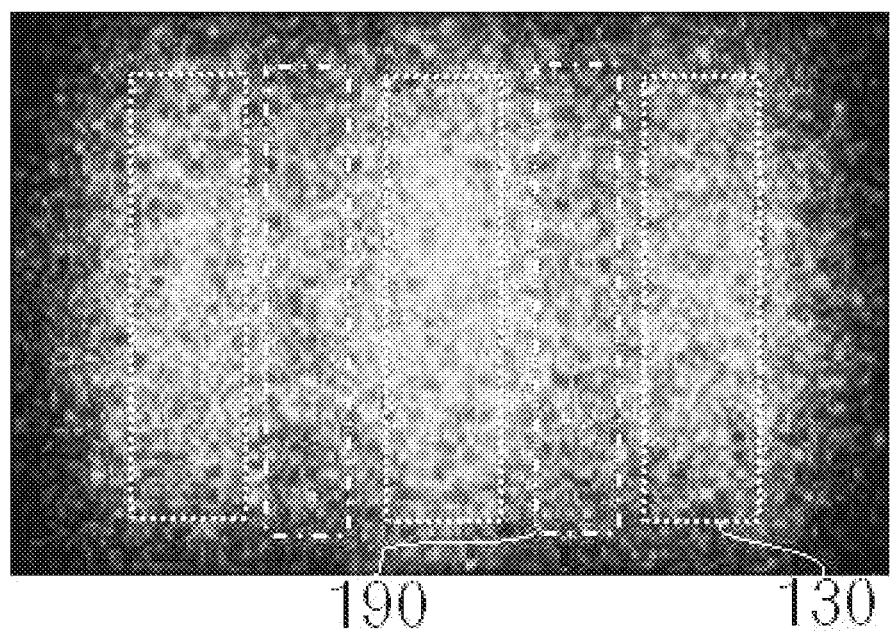
FIG. 4 is a view illustrating an optical simulation result of the backlight unit in FIG. 3A.

Referring to FIG. 4, which is a view illustrating an optical simulation result of the backlight unit in FIG. 3A, a dark portion 190 is generated between adjacent light guide bars 130. By decreasing the distance between adjacent light guide bars 130, the problem of the dark portion 190 can be prevented. However, since more light guide bars 130 are required to decrease the distance between adjacent light guide bars 130, the weight of the backlight unit is increased.

Namely, in the backlight unit including the straight bar shaped light guide bar 130, there is a problem of the dark portion or a disadvantage in the weight.

Figure 5:
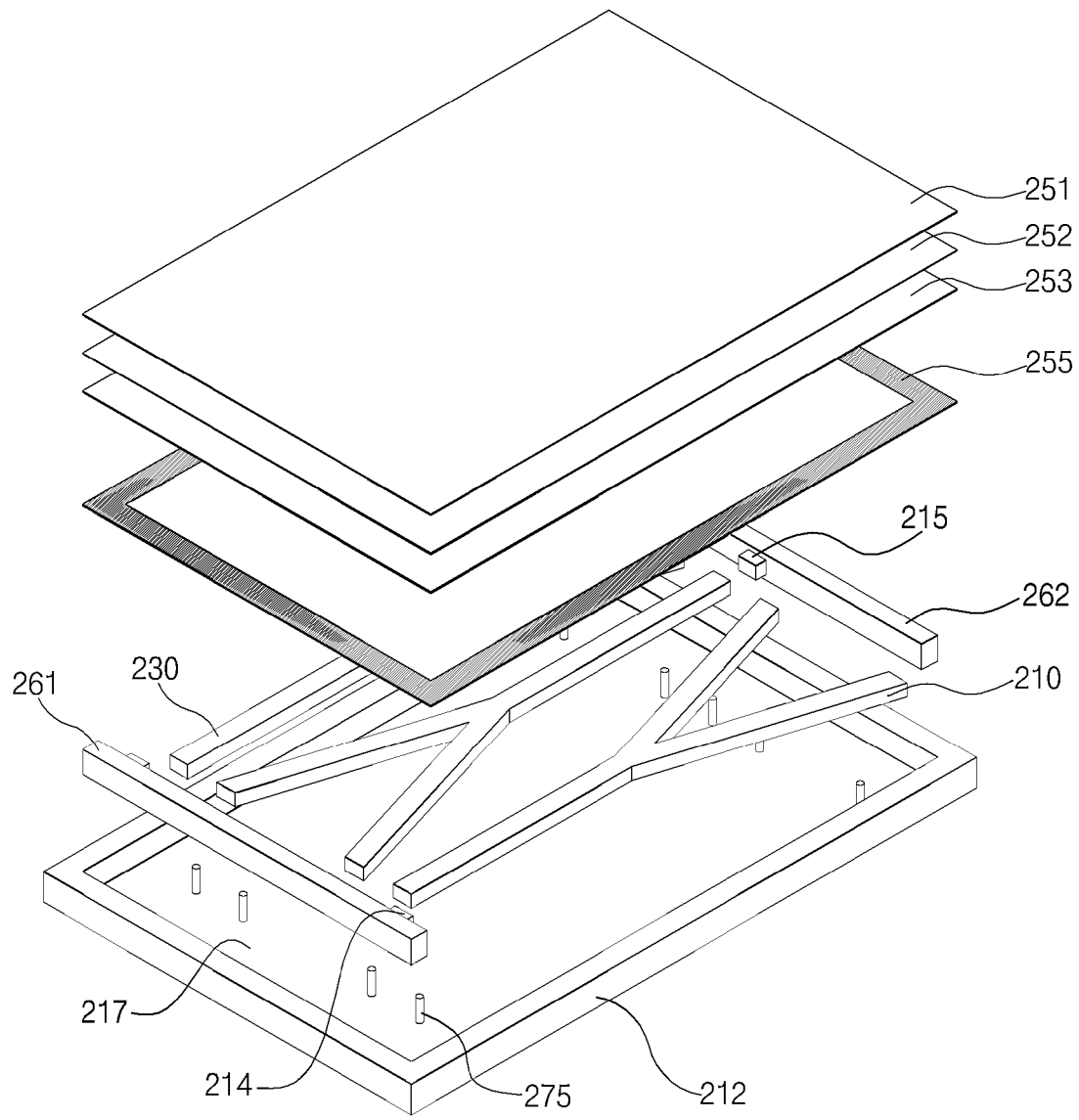
FIG. 5 is an exploded perspective view of a backlight unit according to a second embodiment of the present invention.

FIG. 5 is an exploded perspective view of a backlight unit according to a second embodiment of the present invention.

As shown in FIG. 5, a backlight unit 201 according to the second embodiment of the present invention includes first and second light sources opposite to each other, a plurality of light guide bars 230, and a mold frame 212. A LCD device includes the backlight unit, a liquid crystal panel over the backlight unit, and a main frame surrounding the backlight unit and the liquid crystal panel. The LCD device may further include a top frame covering a front edge of the liquid crystal panel. The main frame and the top frame are combined with the mold frame 212.

Although not shown, the liquid crystal panel includes first and second substrates facing each other as well as a liquid crystal layer therebetween. For example, a pixel electrode is formed on the first substrate, and a common electrode is formed on the first substrate or the second substrate. In addition, first and second polarizing plates are formed on an outer side of each of the first and second substrates.

The first light source includes a plurality of first LEDs 214 and a first circuit board 261, and the second light source includes a plurality of second LEDs 215 and a second circuit board 262. The first and second LEDs 214 and 215 are installed on the first and second circuit boards 261 and 262, respectively. The light guide bars 230 are positioned between the first and second light sources. The first and second light sources and the light guide bar 230 are accommodated in the mold frame 212.

The light guide bar 230 has a branch shape. Namely, a first side of the light guide bar 230 has one end, and a second side of the light guide bar 230 has at least two ends. The light guide bars 230 are reversely arranged. Namely, in two adjacent light guide bars 230, the first side of one light guide bar 230 faces the first light source, and the first side of the other light guide bar 230 faces the second light source. The first LED 214 and the second LED 215 are alternately arranged with each other such that the end of the first side of the light guide bar 230 corresponds to the LED 214 or 215.

The backlight unit 201 may further include a reflection sheet 217 under the light guide bar 230, a diffusion sheet 255 over the light guide bar 230, and at least one optical sheet 251, 252 and 253 on or over the diffusion sheet 255. One or more pins 275 for fixing the light guide bar 230 may be formed on the mold frame 212 or the reflection sheet 217. The pins 275 may be positioned to correspond to a branch portion of the light guide bar 230. For example, the optical sheet may include a diffusion sheet 251 and first and second light concentration sheets 252 and 253.

FIGS. 6A to 6D are views of a light guide bar according to the second embodiment of the present invention, respectively.

As described above, the light guide bar 230 has a first side having one end and a second side having at least two ends.

Figure 6A:
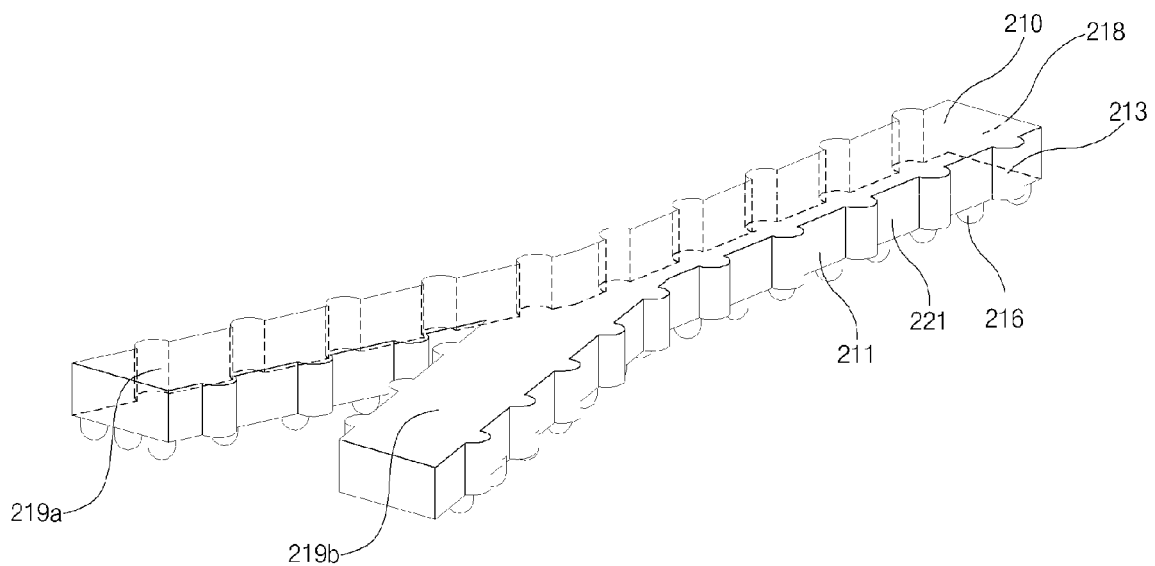
FIGS. 6A through 6D are views of a light guide bar according to the second embodiment of the present invention.

For example, as shown in FIG. 6A, the light guide bar 230 has a "Y" shape. The light guide bar 230 includes an upper surface 210 as a light-output surface, a lower surface 211 as a light reflection surface, a light-incident surface 218, and a side surface 221. The light from the LEDs 214 and 215 is incident to the light-incident surface 218 and passes through branch portions 219a and 219b to be split. The upper surface 210 and the light-incident surface 218 may be flat.

The light, which is incident through the light-incident surface 218, is provided onto the diffusion sheet 255 through the upper surface 210. The light incident to the light guide bar 230 is reflected by the lower surface 211 such that the optical efficiency is improved. In addition, a first protrusion 216 may be formed on the lower surface 211 to further improve the optical efficiency. Alternatively, a concave indent may be formed on the lower surface 211 instead of the first protrusion 216. A second protrusion 213 may be formed on the side surface 221. The light diffusion toward a space between adjacent light guide bars 230 is improved by the second protrusion 213. The light guide bar 230 may further include an insert hole (not shown) at the lower surface 211 for the pin 275 (of FIG. 5). The movement of the light guide bar 230 can be prevented by the pin 275. On the other hand, the light may be concentrated at a corner between the upper surface 210 and the side surface 221 such that a brightness defect is generated. To prevent this problem, the corner between the upper surface 210 and the side surface 221 may have a round shape.

Figure 6B:
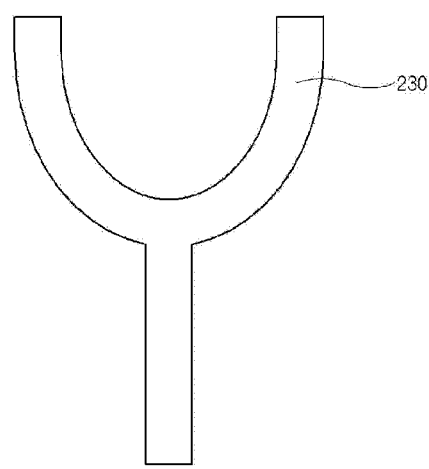
Figure 6C:
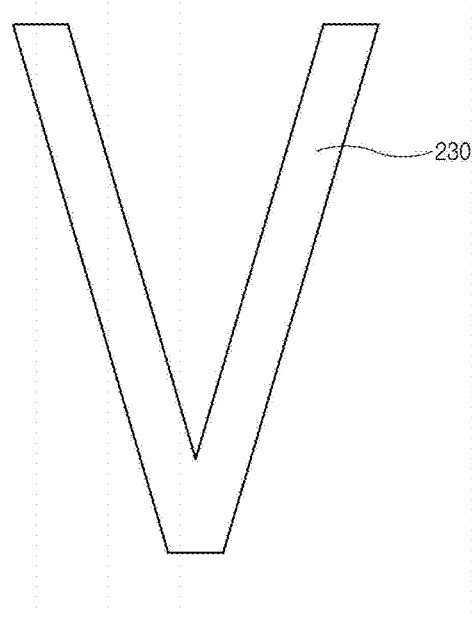
Figure 6D:
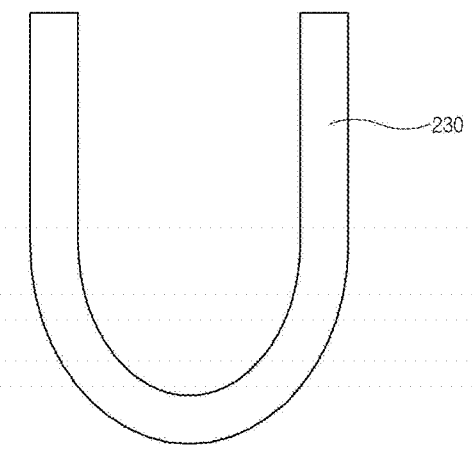

Alternatively, the light guide bar 230 may have a curved "Y" shape as shown in FIG. 6B, a "V" shape as shown in FIG. 6C, or a "U" shape as shown in FIG. 6D. As long as the light guide bar 230 has a branch shape, the specific shape is not limited to those shapes illustrated in FIGS. 6A through 6D. Namely, a first side of the light guide bar 230 has a single light path, and a second side of the light guide bar 230 has at least two light paths to increase a light-diffusion property.

Figure 7:
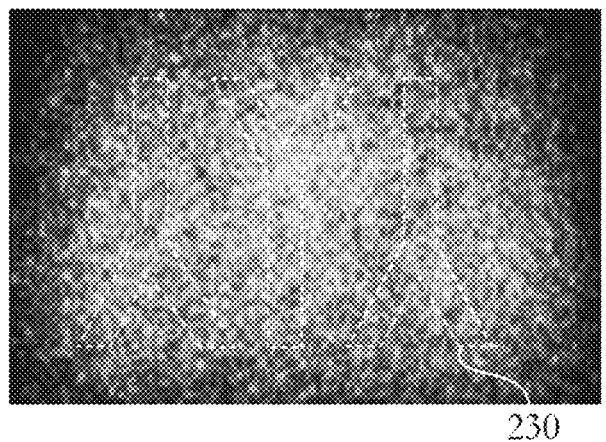
FIG. 7 is a view illustrating an optical simulation result of the backlight unit in FIG. 5.

FIG. 7 is a view illustrating an optical simulation result of the backlight unit in FIG. 5.

As shown in FIG. 7, the backlight unit that includes the light guide bar 230 having the branch shape provides a uniform light distribution at an entire surface. Namely, there is no dark portion 190 (of FIG. 4) due to the improved light diffusion property in the branch-shaped light guide bar 230.

On the other hand, in FIG. 7, the brightness in the upper right portion and the upper left portion is less than the brightness of the other portions. These portions may occur by the single straight portion of the light guide bar 230.

To avoid the above problem, an outermost light guide bar may have another branch, which may be oblique to the single straight portion of the light guide bar, toward the dark portion. This will be explained with reference to FIG. 8.

Figure 8:
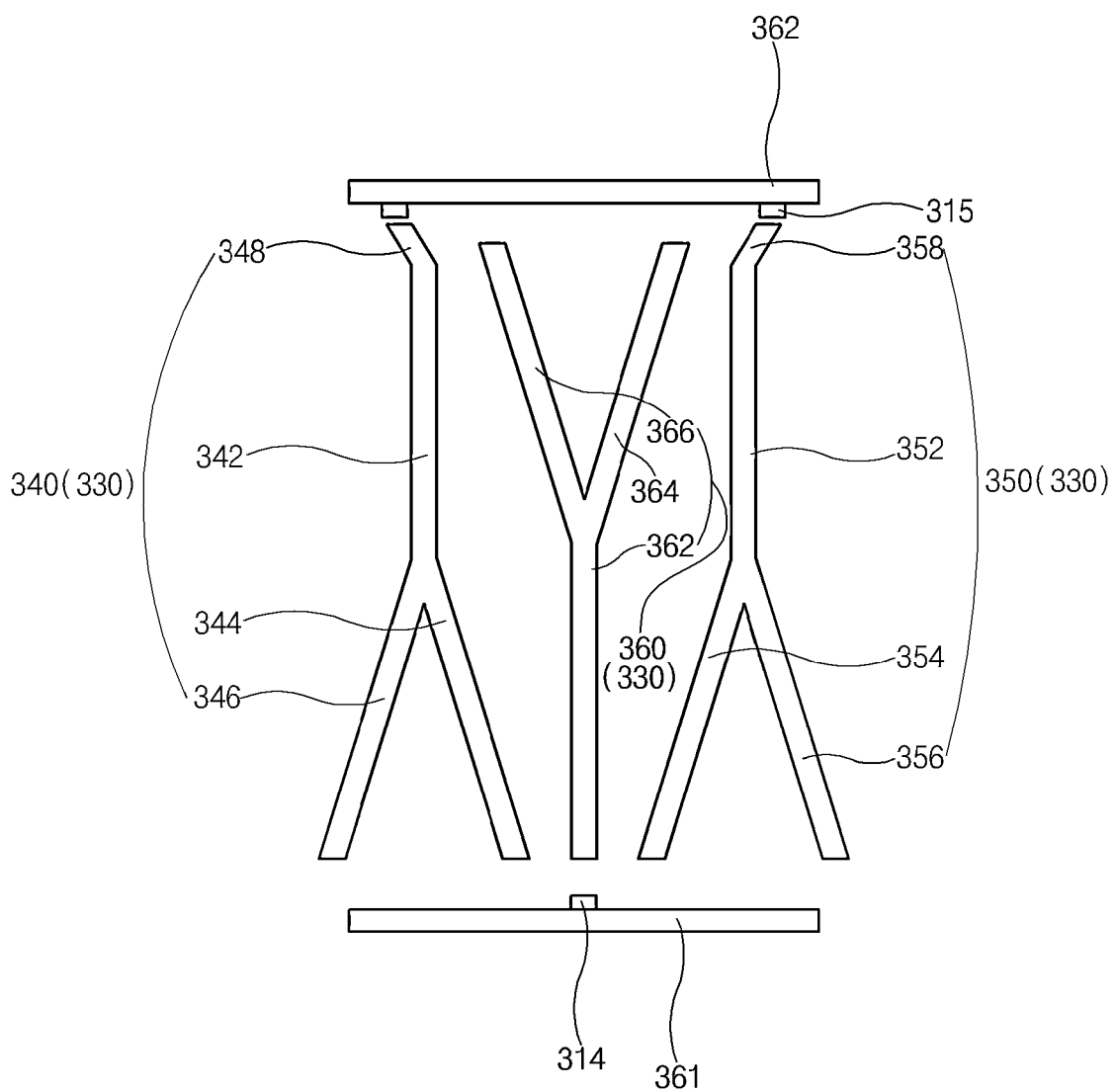
FIG. 8 is a plane view showing a backlight unit according to a third embodiment.

FIG. 8 is a plane view showing a backlight unit according to a third embodiment.

As shown in FIG. 8, a backlight unit according to the third embodiment of the present invention includes first and second light sources opposite to each other, guide bars 330, and a mold frame (not shown).

The first light source includes a plurality of first LEDs 314 and a first circuit board 361, and the second light source includes a plurality of second LEDs 315 and a second circuit board 362. The first and second LEDs 314 and 315 are installed on the first and second circuit boards 361 and 362, respectively. The light guide bars 330 are positioned between the first and second light sources. The first and second light sources and the light guide bars 330 are accommodated in the mold frame.

The light guide bars 330 include a first light guide bar 340, a second light guide bar 350, and at least one third guide bar 360 between the first and second light guide bars 340 and 350.

Each of the first to third light guide bars 340, 350, and 360 has a branch shape. Namely, a first side of each of the first to third light guide bars 340, 350, and 360 has one end, and a second side of each of the first to third light guide bars 340, 350, and 360 has at least two ends.

For example, the third light guide bar 360 may have a "Y" shape or a rounded "Y" shape. Namely, the third light guide bar 360 includes a straight portion 362 and first and second branch portions 364 and 366 branched from one end of the straight portion 362.

On the other hand, the first light guide bar 340 includes a straight portion 342, first and second branch portions 344 and 346, and an extending portion 348. The first and second branch portions 344 and 346 of the first light guide bar 340 are branched from one end of the straight portion 342 of the first light guide bar 340, and the extending portion 348 of the first light guide bar 340 extends from the other end of the straight portion 342 of the first light guide bar 340. Similarly, the second light guide bar 350 includes a straight portion 352, first and second branch portions 354 and 356, and an extending portion 358. The first and second branch portions 354 and 356 of the second light guide bar 350 are branched from one end of the straight portion 352 of the second light guide bar 350, and the extending portion 358 of the second light guide bar 350 extends from the other end of the straight portion 352 of the second light guide bar 350. The extending portions 348 and 358 of the first and second light guide bars 340 and 350 may be oblique to the straight portion 342 and 352 of the first and second light guide bars 340 and 350.

The first to third light guide bars 340, 350, and 360 are reversely arranged in an order of the first to third light guide bars 340, 350, and 360. As a result, the first and second branch portions 344 and 346 of the first light guide bar 340 and the straight portion 362 of the third light guide bar 360, which is adjacent to the first light guide bar 340, face the same circuit board, e.g., the first circuit board 361. Also as a result, the first and second branch portions 354 and 356 of the second light guide bar 350 and the straight portion 362 of the third light guide bar 360, which is adjacent to the second light guide bar 350, face the same circuit board, e.g., the first circuit board 361.

In addition, the first to third light guide bars 340, 350, and 360 are alternately arranged. When two or more third light guide bars 360 are arranged between the first and second light guide bars 340 and 360, the third light guide bars 360 are also alternately arranged with each other in a space between the first and second light guide bars 340 and 350.

In FIG. 8, the first and second light guide bars 340 and 350 have the same arrangement direction. However, when there are even-numbered third light guide bars 360, the first and second light guide bars 340 and 350 are arranged in an opposite direction.

In the arrangement of the first to third light guide bars 340, 350, and 360, the extending portions 348 and 358 of the first and second light guide bars 340 and 350 are arranged outwards, i.e., opposite to the third light guide bar 360. The light diffusion property is improved by the extending portions 348 and 358 such that the dark portion in the upper left side and upper right side in FIG. 7 is eliminated.

Although not shown, the backlight unit according to the third embodiment of the present invention further includes a reflection sheet under the light guide bar, a diffusion sheet over the light guide bar, and at least one optical sheet on or over the diffusion sheet.

In addition, the LCD device includes the backlight unit, a liquid crystal panel over the backlight unit, and a main frame surrounding the backlight unit and the liquid crystal panel. The LCD device may further include a top frame covering a front edge of the liquid crystal panel.

Since the backlight unit according to the present invention includes the light guide bar instead of the light guide plate, there is an advantage in the reduced weight. In addition, since the light guide bar has the branch shape to increase light diffusion efficiency, the problem of the dark portion in the backlight unit including the straight bar shaped light guide bar is prevented with fewer light guide bars.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
   first and second light sources;
   first and second light guide bars positioned between the first and second light sources and each having a branch shape and each including:
      an upper surface,
      a lower surface opposite the upper surface,
      a light-incident surface between the upper surface and the lower surface, the light-incident surface facing one of the first and second light sources, and
      a side surface between the upper surface and the lower surface and adjoining the light-incident surface, the side surface including a plurality of protrusions; and
   a mold frame accommodating the first and second light sources and the first and second light guide bars.

2. The backlight unit according to claim 1, wherein a first side of each of the first and second light guide bars has a single light path, and a second side of each of the first and second light guide bars has at least two light paths.

3. The backlight unit according to claim 2, wherein the first and second light sources include first and second light emitting diodes, respectively.

4. The backlight unit according to claim 3, wherein the first side of the first light guide bar corresponds to the first light emitting diode, and the first side of the second light guide bar corresponds to the second light emitting diode.

5. The backlight unit according to 1, wherein the branch shape of the first light guide bar faces an opposite direction from the branch shape of the second light guide bar.

6. The backlight unit according to claim 1, wherein each of the first and second light guide bars has at least one of a "Y" shape, a rounded "Y" shape, a "V" shape, and a "U" shape.

7. The backlight unit according to claim 1, wherein a corner between the upper surface and the side surface has a round shape.

8. The backlight unit according to claim 1, further comprising at least one third light guide bar between the first and second light guide bars,
   wherein a first side of the at least one third light guide bar has a single light path, and a second side of the at least one third light guide bar has at least two light paths,
   wherein each of the first and second light guide bars includes a straight portion, first and second branch portions branched from a first end of the straight portion, and an extending portion extending from a second end of the straight portion.

9. The backlight unit according to claim 8, wherein the extending portion of each of the first and second light guide bars is oblique to the straight portion of each of the first and second light guide bars.

10. The backlight unit according to claim 8, wherein the extending portion extends outward away from the at least one third light guide bar.

11. The backlight unit of claim 1, wherein the lower surface faces a reflective sheet, wherein the upper surface faces a diffusion sheet, and wherein the first and second light guide bars are disposed between the reflective sheet and the diffusion sheet.

12. The backlight unit of claim 1, wherein the first and second light guide bars are adjacent, and wherein the protrusions on the side surfaces of the first and second light guide bars face each other.

13. The backlight unit of claim 1, wherein the lower surface of each light guide bar includes a plurality of rounded protrusions facing a reflective sheet.

14. A liquid crystal display device, comprising:
   a liquid crystal panel; and
   a backlight unit disposed under the liquid crystal panel, the backlight unit including:
      first and second light sources;
      first and second light guide bars positioned between the first and second light sources and each having a branch shape and each including:
         an upper surface,
         a lower surface opposite the upper surface,
         a light-incident surface between the upper surface and the lower surface, the light-incident surface facing one of the first and second light sources, and
         a side surface between the upper surface and the lower surface and adjoining the light-incident surface, the side surface including a plurality of protrusions; and
      a mold frame accommodating the first and second light sources and the first and second light guide bars.

15. The liquid crystal display device according to claim 14, wherein a first side of each of the first and second light guide bars has a single light path, and a second side of each of the first and second light guide bars has at least two light paths.

16. The liquid crystal display device according to claim 15, wherein the first and second light sources include first and second light emitting diodes, respectively, and wherein the first side of the first light guide bar corresponds to the first light emitting diode, and the first side of the second light guide bar corresponds to the second light emitting diode.

17. The liquid crystal display device according to 16, wherein the branch shape of the first light guide bar faces an opposite direction from the branch shape of the second light guide bar.

18. The liquid crystal display device according to claim 14, the backlight unit further comprising at least one third light guide bar between the first and second light guide bar,
   wherein a first side of the at least one third light guide bar has a single light path, and a second side of the at least one third light guide bar has at least two light paths,
   wherein each of the first and second light guide bars includes a straight portion, first and second branch portions branched from a first end of the straight portion, and an extending portion extending from a second end of the straight portion.

19. The liquid crystal display device according to claim 18, wherein the extending portion of each of the first and second light guide bars is oblique to the straight portion of each of the first and second light guide bars, and the extending portion extends outward away from the at least one third light guide bar.

20. A backlight unit, comprising:
- first and second light sources;
- first and second light guide bars positioned between the first and second light sources, wherein one side of each of the first and second light guide bars has a single light path, and an opposite side of each of the first and second light guide bars has two light paths;
- first, second, and third pins configured to fix each of the first and second light guide bars, the first pin positioned between the two light paths of the opposite side, the single light path of the one side positioned between the second and third pins; and
- a mold frame accommodating the first and second light sources and the first and second light guide bars.

\* \* \* \* \*